United States Patent
Onofri et al.

(10) Patent No.: US 8,297,911 B2
(45) Date of Patent: Oct. 30, 2012

(54) EOLIC GENERATOR

(75) Inventors: Stefano Onofri, Civitavecchia (IT); Giovanni Evangelista, Civitavecchia (IT)

(73) Assignee: Dealer Tecno Srl, Civitavecchia (IT)

( * ) Notice: Subject to any disclaimer, the term of this patent is extended or adjusted under 35 U.S.C. 154(b) by 0 days.

(21) Appl. No.: 13/321,166

(22) PCT Filed: Feb. 24, 2010

(86) PCT No.: PCT/IB2010/050804
§ 371 (c)(1), (2), (4) Date: Dec. 6, 2011

(87) PCT Pub. No.: WO2010/133979
PCT Pub. Date: Nov. 25, 2010

(65) Prior Publication Data
US 2012/0091726 A1    Apr. 19, 2012

(30) Foreign Application Priority Data
May 19, 2009   (IS) .............................. RM2009A0254

(51) Int. Cl.
*F03D 7/06* (2006.01)
(52) U.S. Cl. ......... 415/4.2; 415/4.4; 415/53.2; 415/907; 416/197 A
(58) Field of Classification Search .................... 415/4.2, 415/4.4, 53.1, 53.2, 907; 416/197 A, 211, 416/243
See application file for complete search history.

(56) References Cited

U.S. PATENT DOCUMENTS

| | | | |
|---|---|---|---|
| 4,456,429 A | 6/1984 | Kelland | |
| 4,525,124 A * | 6/1985 | Watson et al. | ............ 416/132 B |
| 5,133,637 A * | 7/1992 | Wadsworth | .................... 415/4.4 |
| 7,241,105 B1 | 7/2007 | Vanderhye et al. | |
| 7,967,569 B2 * | 6/2011 | Yan | ............................ 416/210 R |
| 2008/0187432 A1 | 8/2008 | Cowan | |
| 2010/0278653 A1 * | 11/2010 | Sassow | ..................... 416/223 R |

FOREIGN PATENT DOCUMENTS

| | | |
|---|---|---|
| FR | 40341 | 6/1932 |
| WO | 2007/064155 | 6/2007 |

OTHER PUBLICATIONS

PCT International Search Report for PCT/IB2010/050804 filed on Feb. 24, 2010 in the name of Dealer Tecno SRL.
PCT Written Opinion for PCT/IB2010/050804 filed on Feb. 24, 2010 in the name of Dealer Tecno SRL.
PCT International Preliminary Report on Patentability for PCT/IB2010/050804 filed on Feb. 24, 2010 in the name of Dealer Tecno SRL.

* cited by examiner

*Primary Examiner* — Edward Look
*Assistant Examiner* — Andrew C Knopp
(74) *Attorney, Agent, or Firm* — Steinfl & Bruno, LLP (57) ABSTRACT

A vertical-axis eolic generator is described. The vertical-axis eolic generator may comprise a plurality of vanes and a driving shaft connected to a load bearing structure. The driving shaft may be coupled to the plurality of vanes.

19 Claims, 11 Drawing Sheets

EOLIC GENERATOR

CROSS REFERENCE TO RELATED APPLICATIONS

The present application is the US national stage of International Application PCT/IB2010/050804 filed on Feb. 24, 2010, which, in turn, claims priority to Italian Patent Application RM2009A000254 filed on May 19, 2009.

The present invention refers to an innovative vertical-axis eolic generator.

HISTORY OF THE TECHNOLOGY

Eolic energy is the product of a conversion of the kinetic energy of wind into other forms of energy. To date, such a conversion is carried out by means of eolic generators, which can be horizontal-axis or vertical-axis.

The present invention specifically relates to a vertical-axis eolic generator.

As it is known, for several years now the vertical-axis eolic electric generator has been the subject of studies and implementations for the independence of its operation from wind direction and the simplicity of its implementation, in particular for small installations of a power of the order of some kWs.

Its operation substantially derives from the thrust a wing-type profile is subjected to when impinged upon by a fluid stream, thrust that, opportunely directed by the construction geometry of the machine, produces a torque and therefore the rotary motion of the machine.

DESCRIPTION OF THE PRIOR ART

In observed embodiments, curved longitudinal-axis vanes are generally utilized which, during their motion, describe a spherical surface or a barrel-like surface or the like, anyhow with the concavity facing the axis of rotation of the machine.

Moreover, it has been observed that the cross section of the vanes is generally configured according to a classic wing-like profile, with the concavity always facing the axis of rotation of the machine, non-symmetrical in the plane of its cross section, whereby it maintains its functionality only in a single zone of its circular path.

DRAWBACKS OF THE PRIOR ART

It will be appreciated that the above-described known eolic generators entail significant and evident drawbacks, which are listed hereinafter:
  the vanes of known vertical-axis eolic generators entail remarkable construction complexity, as the vanes are curvilinear longitudinal-axis ones and therefore the process for their manufacturing is generally complex;
  In a starting, low angular velocity stage, torque is negligible and does not support standard machine operation;
  classic-type curvilinear-axis vanes contribute to torque formation only when the machine, by means of an additional motor, is brought past a minimum of angular velocity, since a correct operation thereof is not triggered below such a value;
  once started, the machine tends to increase its angular velocity with wind intensity and needs a protection system in order to prevent it from exceeding a critical angular velocity;
  the surface described by the vanes while covering the circular path in general is a cask-type surface and only the central area, since it is provided with a greater radius of rotation, substantially contributes to torque production;
  the central portion of the vane provides torque only when it, in its circular path, lies on a limited windward area and with a velocity opposite to wind velocity.

OBJECTS OF THE INVENTION

Object of the present invention is to solve the abovementioned drawbacks by providing an eolic generator as substantially described in claim 1.

Further features of the process are defined in the corresponding dependent claims thereof.

ADVANTAGES OF THE INVENTION

The present invention, by overcoming the mentioned problems of the known art, entails several evident advantages.

The eolic generator subject-matter of the present invention has the innovative feature of being equipped with vanes having a rectilinear longitudinal axis, entailing a greater simplicity, and therefore lower construction costs. Moreover, the vanes of the eolic generator subject-matter of the present invention have a cross section with a concave profile that is simple and provided with an axis of symmetry.

As will be detailed hereinafter, the area of aerodynamic interaction between vanes and wind can be subdivided, according to a plan view, into four quadrants. The convexity of the profile of the vane of the generator subject-matter of the present invention faces the internal portion of the path of the vane, in a manner such that the vane itself be active (therefore contributing to the production of a useful torque collected at the driving shaft) both when it lies in the first quadrant, when advancing against the wind, and in the first section of the third quadrant when its velocity is concordant with wind velocity.

Even in a starting, low velocity stage, torque is provided by the vane in two distinct path positions, remarkably increasing the performance of the machine under said delicate operation modes.

Along the longitudinal development of each vane, two areas are found which contribute more to torque generation, each one located substantially at respectively a top portion and a bottom portion of the vane. For this reason, at said portions where maximum efficiency for torque production is found, in the generator subject-matter of the present invention additional vanes are advantageously positioned, which contribute to sensibly increase produced torque, especially in the starting stage or under low regimens.

Such additional vanes contribute to generate a remarkable turbulence in the leeside area of the machine, limiting the resisting torque of the vane when it moves in such low-regimen area and enhancing it with the increasing of "ω", in a manner such as to also offer a system for self-adjusting the machine, in order to prevent it from reaching possibly dangerous critical velocities.

BRIEF DESCRIPTION OF THE DRAWINGS

Still further advantages, as well as the features and the operation modes of the present invention, will be made apparent in the following detailed description of a preferred embodiment thereof, given by way of example and not for limitative purposes. Reference will be made to the figures of the annexed drawings, wherein.

DETAILED DESCRIPTION OF THE DRAWINGS

Figure 1:
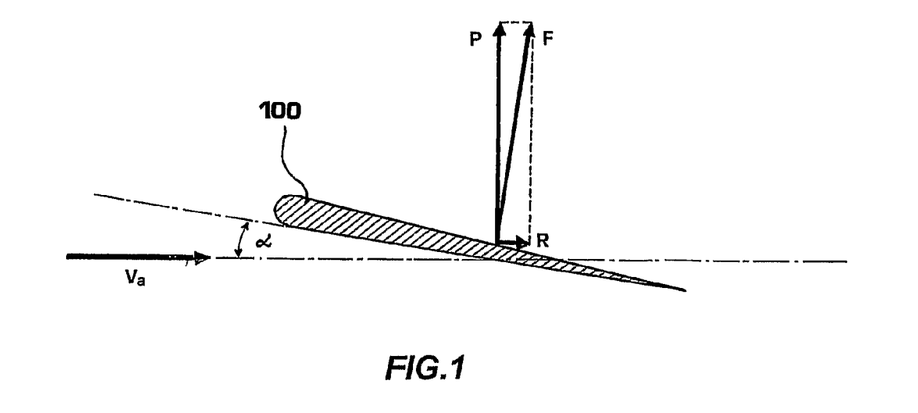
FIGS. 1 and 2 show each a generic aerodynamic profile impinged upon by a fluid stream.

Referring to FIG. 1, a generic vertical-axis eolic generator comprises vanes for which a profile 100 is shown. Such a profile 100 is normally impinged upon by a fluid stream, whose velocity is identified by vector $V_a$ in the figure, which produces on the profile and therefore on the related vane an active force F that may be generally broken out into a component R parallel to the fluid stream and a component P perpendicular thereto, when the angle of incidence α is approximately comprised between 0° and 15°.

Figure 2:
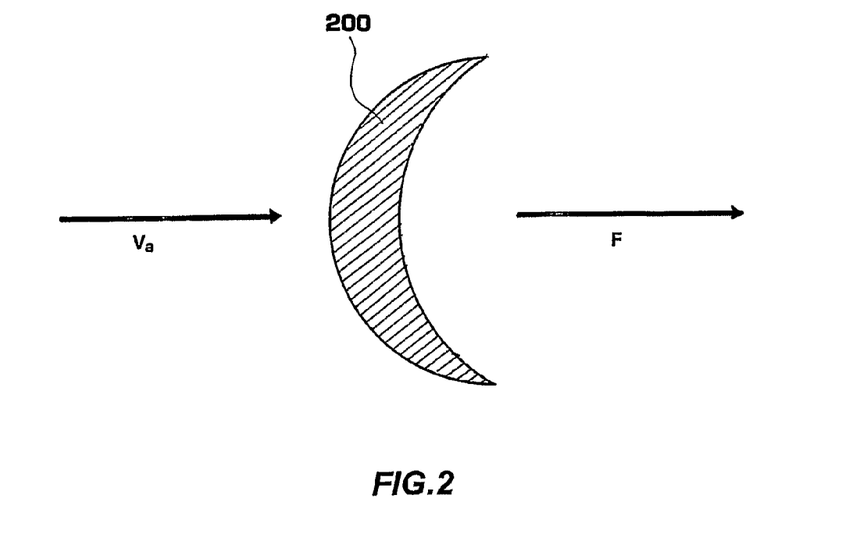

Referring to FIG. 2, a profile 200 is shown for which the angle of incidence is not comprised anymore between the values indicated in the preceding case. In this case the profile 200 of the vane is impinged upon by the fluid stream and subjected to a resisting force F which in general has a direction and a sense equal to the fluid stream identified by vector $V_a$ in the figure.

As is amply known to a person skilled in the art, in both cases shown, the force F generated following interaction between fluid stream and wing profile has a numeric value generally proportional to the square of the velocity modulus $V_a$.

In a vertical-axis eolic generator, each section of each vane during a rotary motion of the machine gets to lie, at subsequent instants, in either of the conditions illustrated in FIG. 1 or in FIG. 2.

In general, the geometric configuration of the machine tends of course to cause the effects of the condition of FIG. 1 to be prevalent with respect to those associated to the condition of FIG. 2, and this is attained by processing more or less complex profiles of the vane, both concerning its longitudinal axis and the profile characterizing it.

Figure 3:
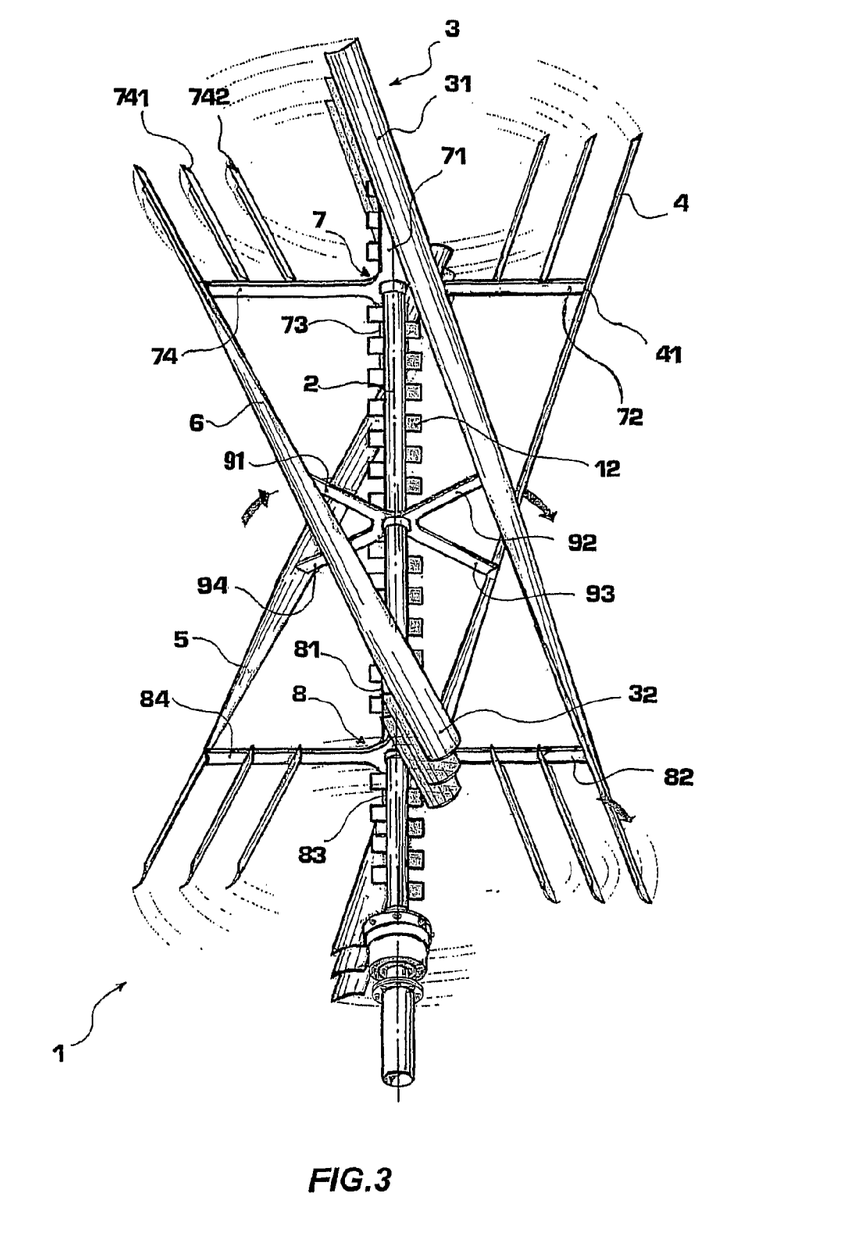
FIG. 3 shows a perspective view of an eolic generator subject-matter of the present invention according to a first preferred embodiment thereof.

Referring to next FIG. 3, it is shown a vertical-axis eolic generator 1 subject-matter of the present invention according to a first preferred embodiment thereof. In particular, the eolic generator 1 comprises a driving shaft 2 rotatably connected to a load bearing structure (not depicted for the sake of clarity in the description) and integrally coupled, in the manner that will be described in detail below, to a plurality of vanes 3, 4, 5, 6. In the present preferred embodiment, given here by way of example and not for limitative purposes, the vanes coupled to the driving shaft 2 are four, but they could also be in a different number as will be illustrated hereinafter.

Each vane has a substantially rectilinear longitudinal axis.

The vanes are connected to the driving shaft by a pair of spline elements. In particular, said pair comprises a top spline element 7, placed at a top portion of the driving shaft 2, and a bottom spline element 8, the latter placed at a bottom portion thereof.

The top 7 and bottom 8 spline elements respectively have a plurality of arms, each connected to a respective vane. In particular, since the preferred embodiment described herein comprises four vanes, the top 7 and bottom 8 spline elements each comprise respectively four top arms 71, 72, 73, 74 and four bottom arms 81, 82, 83, 84. Preferably, such top and bottom arms are angularly equispaced thereamong. In other words, all pairs of arms define respective angles equal therebetween.

In the case described herein with four vanes, said arms have a cross-like shape, as each arm forms, with an arm consecutive thereto, a substantially right angle.

Hence, hereinafter in the present treatment of such a preferred embodiment the spline elements 7 and 8 will be referred to as top cross 7 and bottom cross 8.

Always referring to FIG. 3, evidently the top 7 and bottom 8 crosses have arms opposite two-by-two. In particular, the arm 71 of the top cross 7 is opposite to the arm 81 of the bottom cross, the arm 72 is opposite to the arm 82 and so on for all of the others.

Considering now by way of example vane 3, yet clearly the principle holds true for each vane of the generator, the former is connected to the top arm 71 at a top part 31 thereof, and is connected to the bottom arm 82 at a bottom part 32 thereof. In particular, the bottom arm 82 is the arm angularly consecutive to the bottom arm 81 opposite to the top arm 71, to which the vane 3 is connected as highlighted above.

Therefore, thus the vane 3 assumes a tilt with respect to the driving shaft 2, the latter placed along the vertical axis of the eolic generator.

In an entirely analogous manner, the vane 4 is connected between the top arm 72 and the bottom arm 83, angularly consecutive with respect to the bottom arm 82 opposite to the top arm 72.

Moreover, the eolic generator comprises a third spline element 9, apt to connect the vanes 3, 4, 5 and 6 to the driving shaft 2 at a central portion thereof. It will be appreciated that, in this case as well, the third spline element 9 has the shape of a cross, having central arms 91, 92, 93, 94 angularly equispaced thereamong and forming a substantially right angle thereamong. It will be appreciated that the positioning of such a central cross increases the solidity of the generator 1, as it contributes to decrease any flexural vibrations generated by the vanes during their rotary motion.

Lastly, additional vanes, in the figure denoted by way of example and not for limitative purposes by reference numbers 741 and 742, are advantageously cantilevered on the top and bottom arms. The additional vanes 741 and 742 are cantilevered on the top arm 74 in a manner substantially parallel to the vane 6, connected just with the arm 74.

The generator vanes and the hereto-described additional vanes are connected to the arms of the crosses by preferably reversible mechanical connection means. In particular, each vane is integral, at the top and bottom parts thereof, respectively to a top plate and a bottom plate; said plates are bolted to the respective top and bottom arms. E.g., always referring to FIG. 1, the vane 4 comprises a top plate 41 connected by bolting to the respective top arm 72, and a bottom plate (not visible in figure) connected to the bottom arm 83.

Moreover, the driving shaft has, along its vertical development, a plurality of fins 12, serving as generators of turbulence. The turbulence generated by the fins 12 is such as to produce effects on the vanes lying in a leeside area of the generator, i.e., the area in which the vanes are impinged upon by the fluid stream once it has already gone past the driving shaft 2.

Figure 4:
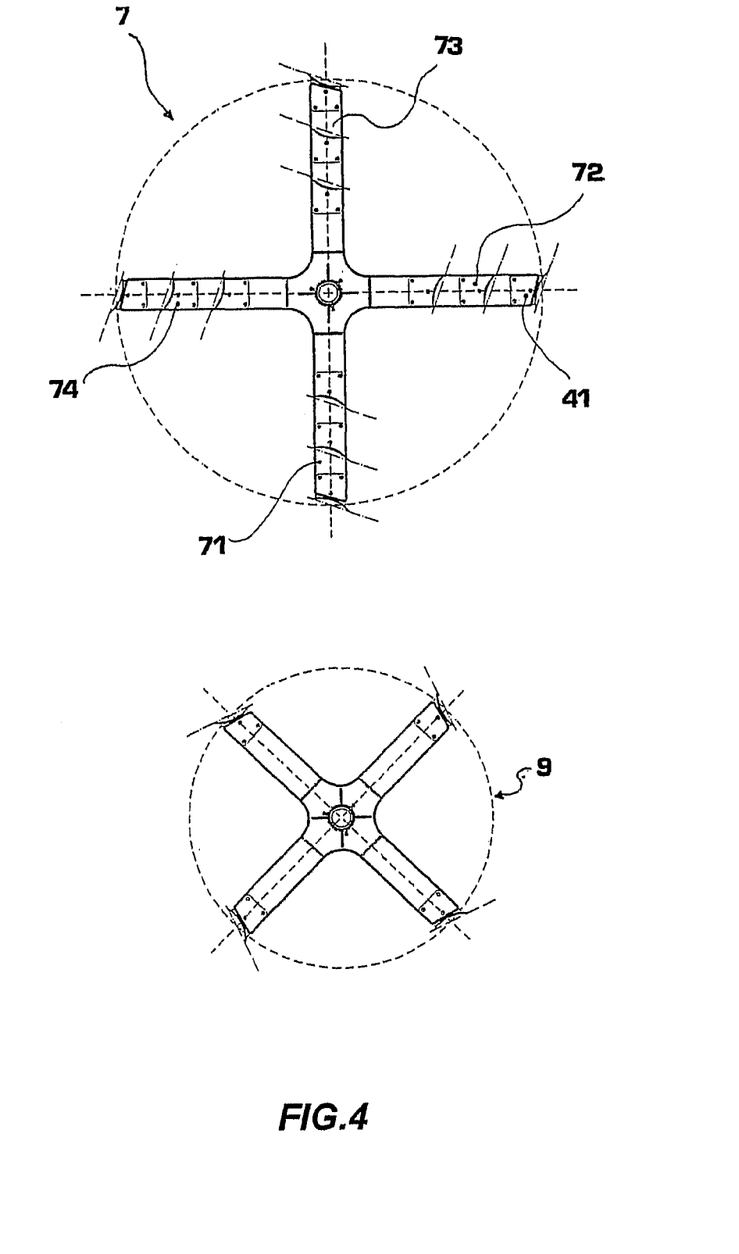
FIG. 4 shows in a plan view a detail of the eolic generator of FIG. 3.

Referring to FIG. 4, the top cross 7 is shown (yet, evidently such a view would also apply to the bottom cross), in which there can be seen the arms 71, 72, 73 and 74, arranged at a right angle the one with respect to the other.

Moreover, always in the same figure, the central cross 9 is depicted, which is tilted of 45° with respect to the top cross (and also with respect to the bottom cross not depicted) due to the above-illustrated tilt of the vanes.

Figure 5:
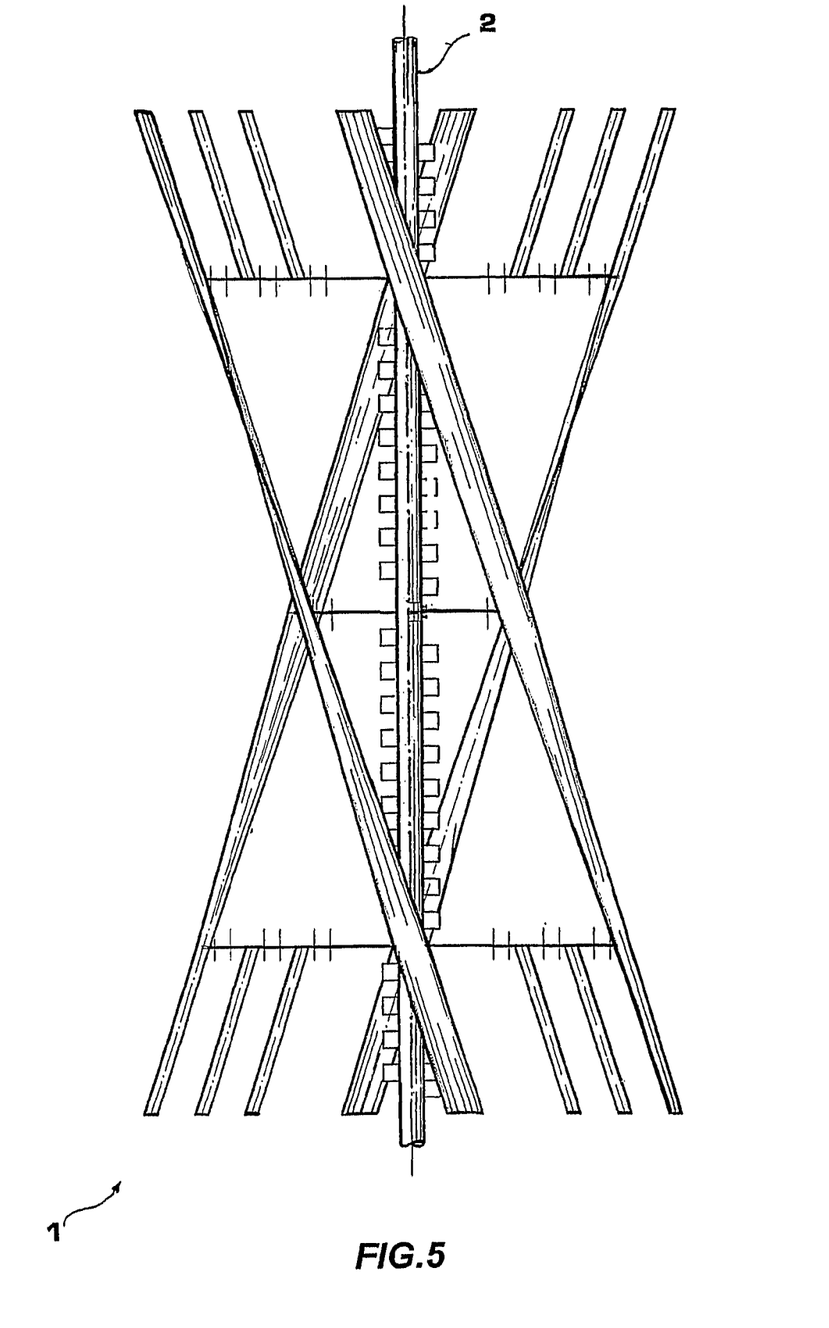
FIG. 5 shows in a front view the eolic generator subject-matter of the present invention.

Referring now to FIG. 5, it will be appreciated that thanks to the above-described arrangement, the vanes are apt to describe, during their motion of revolution about the driving shaft 2, a surface substantially comparable to a hyperbolic paraboloid.

Such a surface, also referred to as "skew ruled", is perfectly known to a person skilled in the art, therefore its properties will not be discussed further.

It will be appreciated that, with the increasing of the number of vanes, the surface described during their motion will be such as to approximate ever better such a geometric figure of hyperbolic paraboloid.

Figure 6:
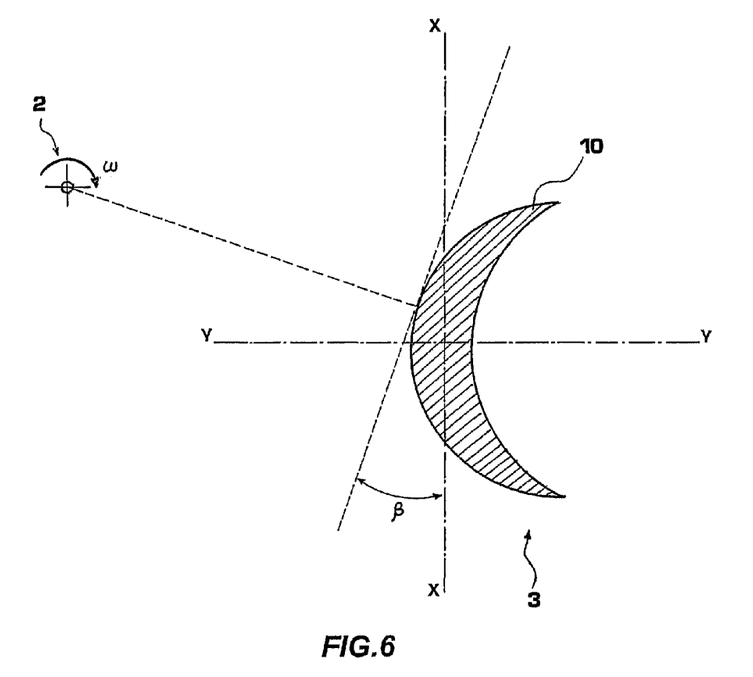
FIG. 6 shows a detail of FIGS. 3 and 4.

Referring now to FIG. 6, a profile 10 of the vane 3 is shown, yet clearly the vane 3 is selected by way of example, since what will be described holds true for all vanes of the eolic generator 1 subject-matter of the present invention. In particular, the profile 10 is substantially crescent-shaped, and has an axis of symmetry y-y. The vane 3 is such that its profile 10, along all of its longitudinal development, faces its convexity always toward the driving shaft 2. Moreover, always as shown in the figure, the profile 10 has an axis x-x, orthogonal to the axis of symmetry y-y, forming an angle of deviation β with respect to the tangent to the path of the vane.

Figure 7:
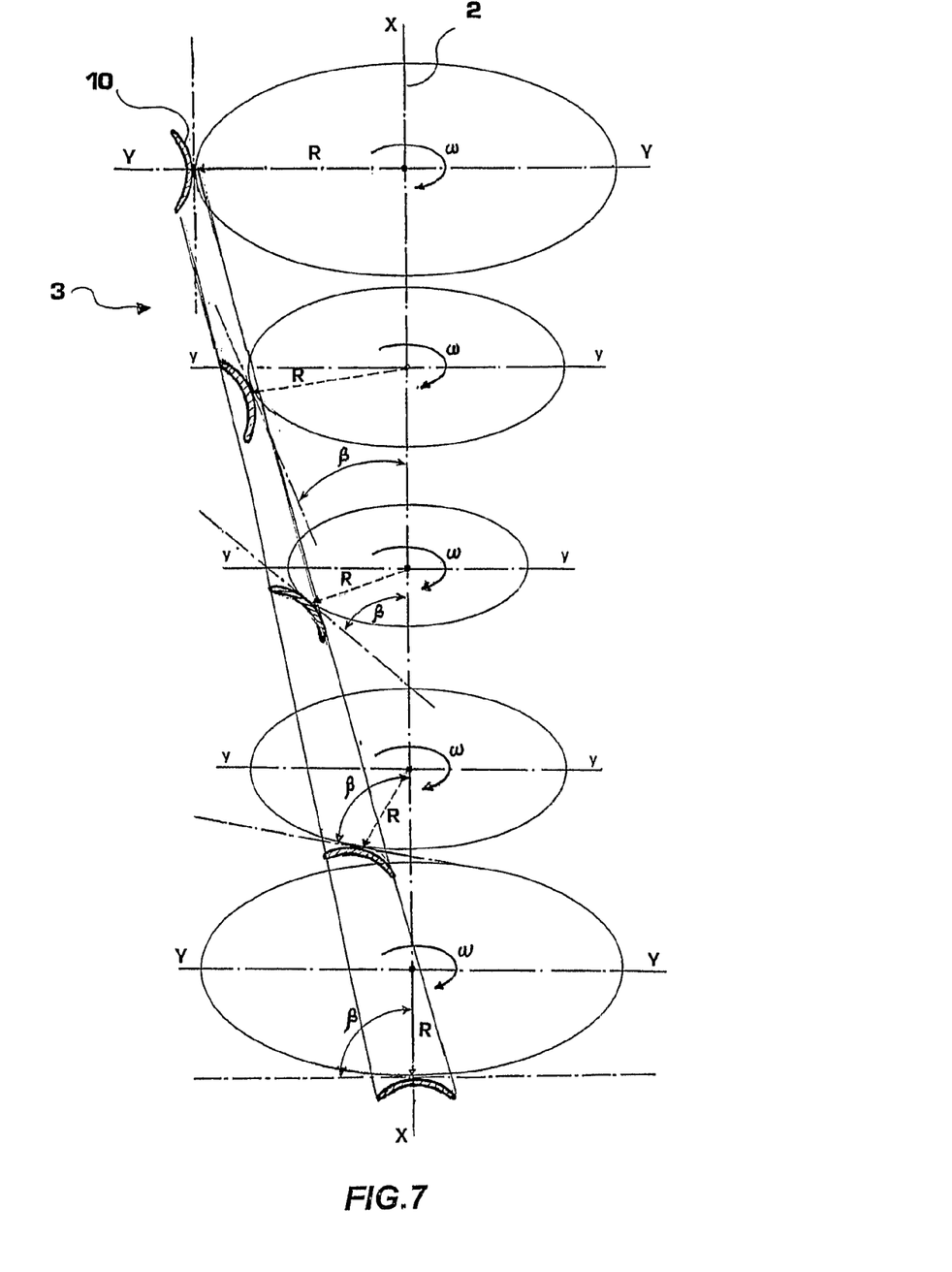
FIG. 7 shows in a perspective view a detail of FIGS. 3 and 4.

Referring now to FIG. 7, it is shown the evolution of the tilt of the profile 10 (and therefore essentially the variation along the axis of the angle of deviation β) along the longitudinal development of the vane 3. Thus, a particular twist of the vane is obtained just by keeping the convexity of the profile 10 facing the driving shaft 2.

In the case considered, of a four-vane eolic generator, from the top cross to the bottom cross the profile 10 undergoes a rotation of about 90°.

The manufacturing modes for a vane having a twist as described above are amply within the reach of a person skilled in the art and will not be described below. Hereinafter, some aerodynamic analyses of the generator 1 subject-matter of the present invention are described.

Figure 8:
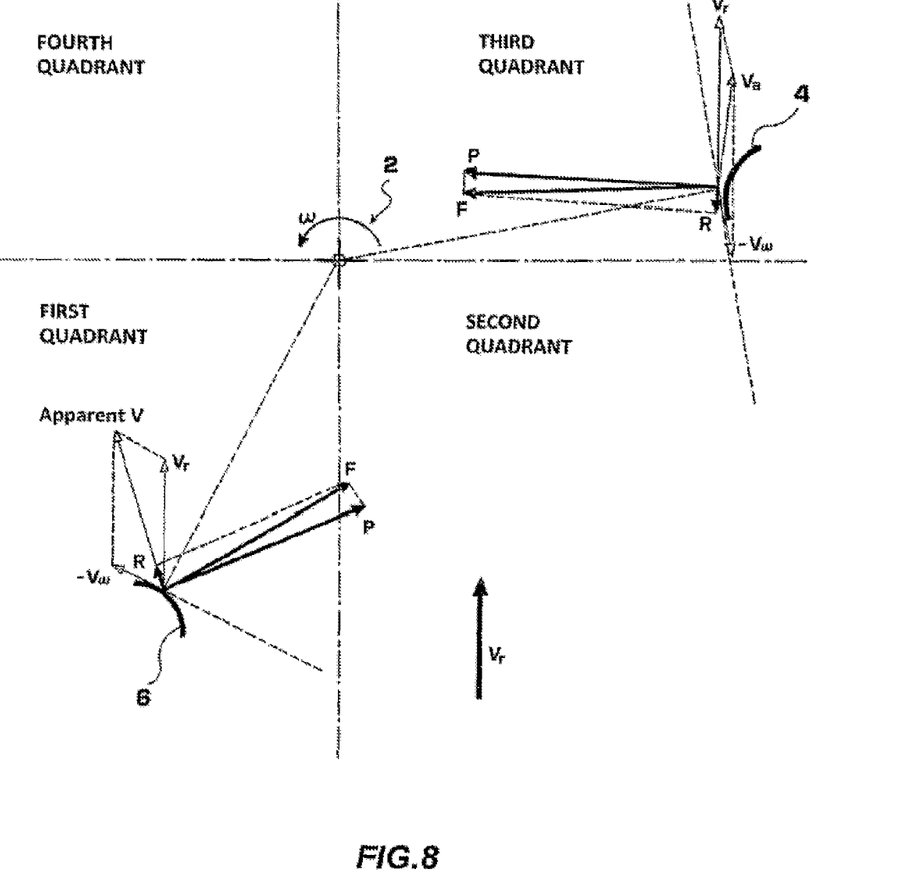
FIGS. 8-10 schematically show aerodynamic aspects of some operation instants of the generator subject-matter of the present invention.

Referring to FIG. 8, the generator 1 is schematically shown in a plan view; in particular, there are depicted the driving shaft 2, set in rotation with a counterclockwise velocity ω by the vanes impinged upon by a wind having a velocity identified by vector Vr, and backs of the profiles of the vanes 6 and 4. It will be appreciated that what is illustrated for said two vanes will recur cyclically for all other vanes of the generator.

The vanes/wind interaction area is conventionally divided into four quadrants, to which reference will be made in the following description.

For the above-described particular symmetric profile of the vane, it is obtained the positive thrust (determined by forces P in the Figure) in the first quadrant and in the first section of the third quadrant. In particular, the first quadrant identifies a windward area (i.e., first impinged upon by the fluid stream having a velocity Vr) in which the velocity of the vane $V_{107}$ is opposite to the velocity of the fluid stream and, in the first section of the third quadrant and wherein the vane has a velocity concordant with wind velocity and with $V_v < V_r$.

Figure 9:
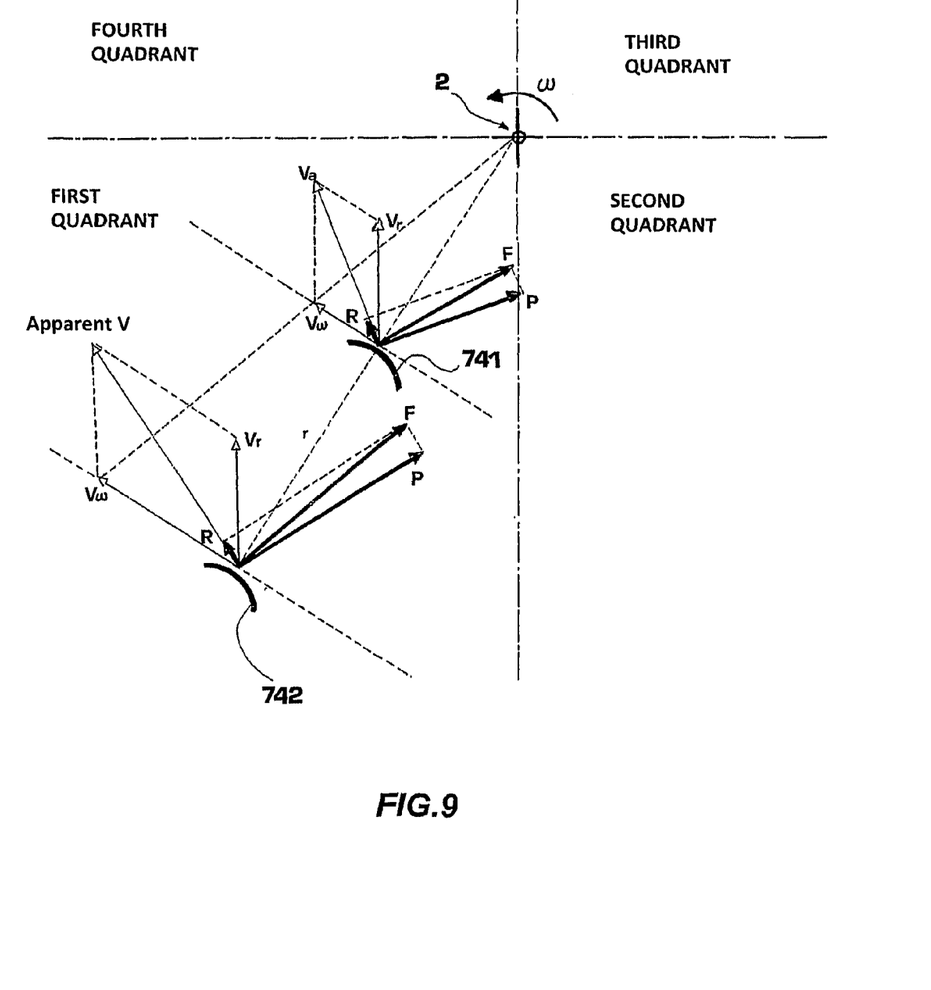

Referring now to FIG. 9, in the first quadrant there are depicted backs of the additional vanes 741 and 742, which maintain the same configuration of the vanes but evidently are provided with a smaller radius of rotation. Said backs, as clearly seen from the figure, have the main function of causing a remarkable increase of the torque, in particular during the starting stage, and a torque such as to reach a minimum angular velocity "ω" needed for generator operation also in the presence of modest winds.

Figure 10:
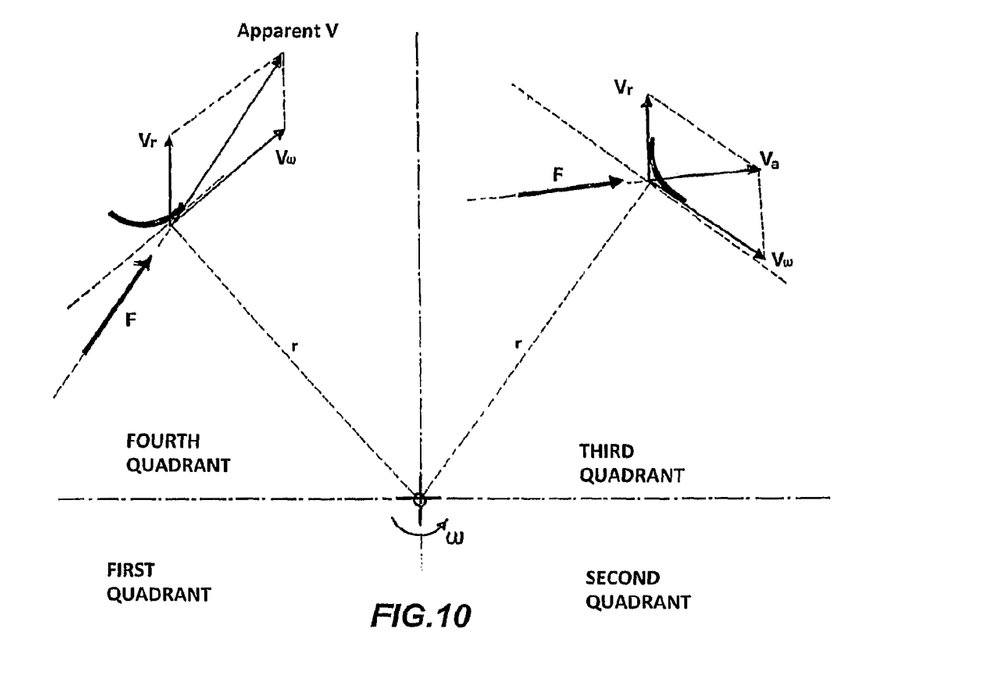

Referring to FIG. 10, there are shown two backs of vanes lying in a leeside area (third and fourth quadrant) and for which the interaction between them and the fluid stream, especially for high values of the angular velocity of the driving shaft, tends to generate a resisting torque. In fact, the direction of the forces F shown in figure tends to rotate the shaft in a clockwise direction opposite to the direction of rotation. Advantageously, as shown in the foregoing, along the driving shaft the machine is equipped with fins generators of turbulence, which generate remarkable turbulence in the leeside area, especially with high values of the angular velocity ω, in order to reduce any positive effect of the lift of the vanes in the third and fourth quadrant and therefore determine a resisting torque which increases with the second power of "ω". Hence, generated turbulence decreases the effects of lift F which produces said resisting effect. Therefore, it is offered merely a resistance to the same motion of the vanes in the leeway areas of the third and fourth quadrant indicated in the figure.

In general, the eolic generator subject-matter of the present invention, being $k_1$ and $k_2$ coefficients depending on its geometry, has a torque synthetically represented by the simple expression:

$$C_m = k_1 S_1 V_r^2$$

whereas a resisting torque likewise assumes the expression:

$$C_r = k_2 S_2 V_r^4$$

Hence, the torque available for the electric generator is $$C_G = C_m - C_r = k_1 S_1 V_r^2 - k_2 S_2 V_r^4$$

An expression reaching its maximum value for $$\frac{\delta C_G}{dV_r} = 2k_1 S_1 V_r - 4k_2 S_2 V_r^3 = 2k_1 S_1 V_r \left\{ 1 - \frac{4k_2 S_2}{2k_1 S_1} V_r^2 \right\} = 0$$

i.e., for $$V_{rm} = \left\{ \frac{k_1 S_1}{2k_2 S_2} \right\}^{\frac{1}{2}} = \frac{1}{2^{\frac{1}{2}}} \left\{ \frac{k_1 S_1}{k_2 S_2} \right\}^{\frac{1}{2}}$$

Therefore, the eolic generator subject-matter of the present invention is self-protected from angular velocities harmful to its structure and to electrical apparatuses, as $C_G$ cancels out for:

$$C_G = k_1 S_1 V_r^2 - k_2 S_2 V_r^4 = 0$$

An equation admitting the real and positive solution:

$$V_{ro} = \left\{ \frac{k_1 S_1}{k_2 S_2} \right\}^{\frac{1}{2}}$$

Figure 11:
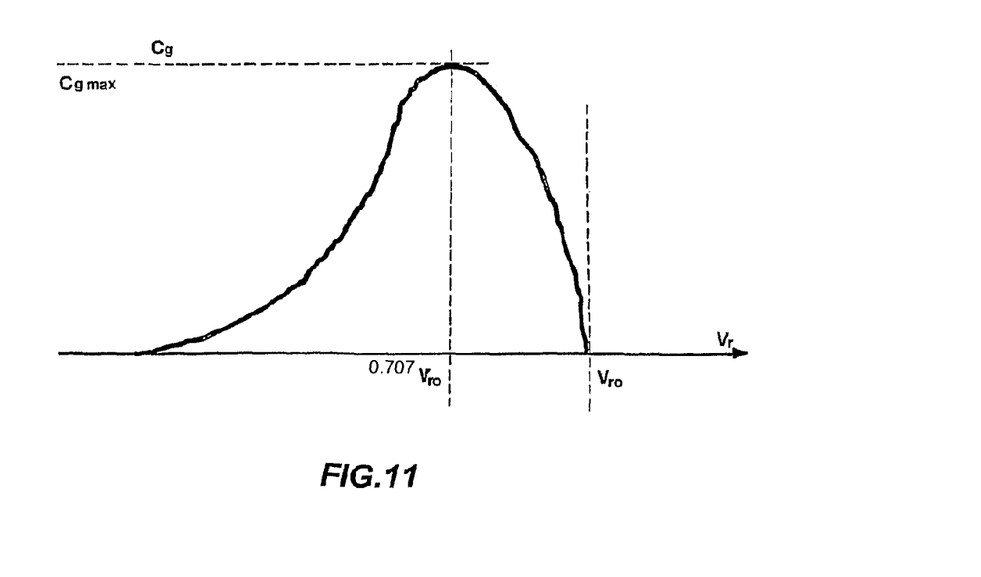
FIG. 11 shows a graph reporting an operation curve of the generator subject-matter of the present invention.

In short, what has been analyzed hereto is highlighted in the diagram of FIG. 11. In it, the self-protection ability of the machine is evident, determined by the rapidity with which the torque available for the generator decreases with the increasing of wind intensity past the field of normal use, whose values fall within the neighborhood of $0.707 \times V_{ro}$.

Figure 12:
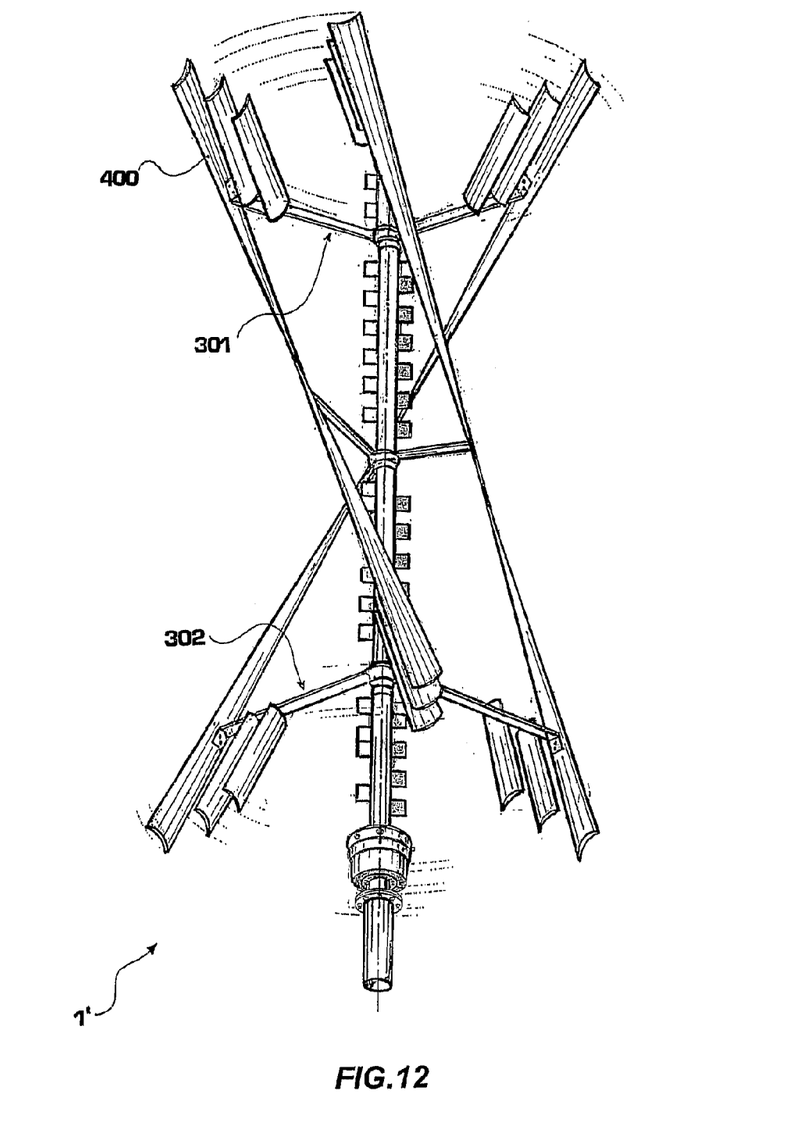
FIG. 12 shows in perspective an eolic generator subject-matter of the present invention according to a second preferred embodiment thereof.
Figure 13:
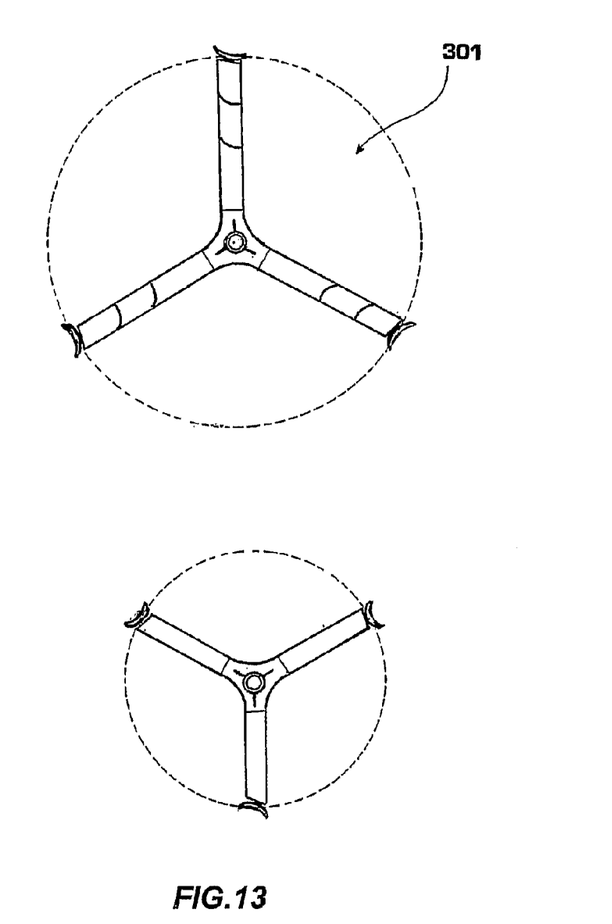
FIG. 13 shows in a plan view a detail of the eolic generator of FIG. 12.

Referring now to the last FIGS. 12 and 13, an eolic generator 1' according to a second preferred embodiment thereof is depicted. The substantial difference with respect to the first preferred embodiment lies in that the generator 1' is equipped with three vanes. The implementation principle is absolutely equivalent and therefore will not be described in detail.

The generator 1' comprises top 301 and bottom 302 spline elements, which this time comprise each top and bottom arms which are angularly spaced thereamong of an angle equal to about 120°, and therefore have a substantially Y-like shape. The vanes of the generator, for which it is denoted by way of example and not for limitative purposes the vane 400 in figure, have a symmetric crescent-shaped profile, but one which undergoes a rotation of a 120° angle at the various sections of the vane along the longitudinal development thereof.

At most, the eolic generator subject-matter of the present invention could also be implemented with only two vanes. In this case (not depicted) the spline elements will have two arms spaced therebetween of a 180° angle and the vanes will be substantially arranged in an X-like shape with respect to the driving shaft.

The present invention has been hereto described with reference to two preferred embodiments thereof. It is understood that other embodiments might exist, all falling within the concept of the same invention, and all comprised within the protective scope of the claims hereinafter.

The invention claimed is:

1. A vertical-axis eolic generator, comprising:
   i) a driving shaft rotatably connected to a load bearing structure, and
   ii) a plurality of vanes,
   wherein:
   said driving shaft is integrally coupled to said plurality of vanes, each vane extending along a substantially rectilinear longitudinal axis,
   an arrangement of said plurality of vanes with respect to said driving shaft is such that said plurality of vanes and said driving shaft are configured to describe, during a motion of said plurality of vanes, a surface substantially a hyperboloid of one sheet, and
   each vane of said plurality of vanes has a substantially crescent-shaped profile, the substantially crescent-shaped profile having an axis of symmetry, wherein each vane has a twist adapted to maintain convexity of said substantially crescent-shaped profile facing said driving shaft along a longitudinal development of said vane.

2. The vertical-axis eolic generator according to claim 1, wherein said plurality of vanes is connected to said driving shaft by at least one pair of spline elements.

3. The vertical-axis eolic generator according to claim 2, wherein said at least one pair of spline elements comprises a top spline element placed at a top portion of said driving shaft and a bottom spline element placed at a bottom portion of said driving shaft.

4. The vertical-axis eolic generator according to claim 3, wherein said top spline element comprises two or more top arms and said bottom spline element comprises two or more bottom arms.

5. The vertical-axis eolic generator according to claim 4, wherein said two or more arms of each spline element are angularly equispaced thereamong.

6. The vertical-axis eolic generator according to claim 4, wherein each vane of said plurality of vanes is connected, at a top part of the vane, to a top arm, and, at a bottom part of the vane, to a first bottom arm, the first bottom arm being angularly consecutive to a second bottom arm opposite to said top arm.

7. The vertical-axis eolic generator according to claim 4, further comprising one or more additional vanes cantilevered on said two or more top arms and/or said two or more bottom arms.

8. The vertical-axis eolic generator according to claim 7, wherein each arm of said two or more top arms and two or more bottom arms comprises at least one additional vane, the at least one additional vane being arranged substantially parallel to a vane of said plurality of vanes connected with said arm.

9. The vertical-axis eolic generator according to claim 2, further comprising a third spline element placed at a central portion of said driving shaft, said third spline element configured to connect each vane of said plurality of vanes to said driving shaft at the central portion of said driving shaft.

10. The vertical-axis eolic generator according to claim 9, wherein said third spline element comprises two or more central arms, said two or more central arms being angularly equispaced thereamong.

11. The vertical-axis eolic generator according to claim 10, wherein each central arm is connected to a vane of said plurality of vanes.

12. The vertical-axis eolic generator according to claim 1, wherein said driving shaft has, along a vertical development of said driving shaft, a plurality of fins configured to serve as generators of turbulence acting in a leeside area.

13. The vertical-axis eolic generator according to claim 5, wherein each vane of said plurality of vanes is connected, at a top part of the vane, to a top arm, and, at a bottom part of the vane, to a first bottom arm, the first bottom arm being angularly consecutive to a second bottom arm opposite to said top arm.

14. The vertical-axis eolic generator according to claim 5, further comprising one or more additional vanes cantilevered on said two or more top arms and/or said two or more bottom arms.

15. The vertical-axis eolic generator according to claim 6, further comprising one or more additional vanes cantilevered on said two or more top arms and/or said two or more bottom arms.

16. The vertical-axis eolic generator according to claim 3, further comprising a third spline element placed at a central portion of said driving shaft, said third spline element configured to connect each vane of said plurality of vanes to said driving shaft at the central portion of said driving shaft.

17. The vertical-axis eolic generator according to claim 4, further comprising a third spline element placed at a central portion of said driving shaft, said third spline element configured to connect each vane of said plurality of vanes to said driving shaft at the central portion of said driving shaft.

18. The vertical-axis eolic generator according to claim 2, wherein said driving shaft has, along a vertical development of said driving shaft, a plurality of fins configured to serve as generators of turbulence acting in a leeside area.

19. The vertical-axis eolic generator according to claim 3, wherein said driving shaft has, along a vertical development of said driving shaft, a plurality of fins configured to serve as generators of turbulence acting in a leeside area.

* * * * *